July 13, 1948.    C. W. CRUMRINE    2,445,166
ANIMAL TRAP

Filed Dec. 17, 1942    2 Sheets-Sheet 1

INVENTOR
Chester W. Crumrine
BY
Bean, Brooks, Buckley & Bean
ATTORNEYS

July 13, 1948.  C. W. CRUMRINE  2,445,166
ANIMAL TRAP
Filed Dec. 17, 1942  2 Sheets-Sheet 2
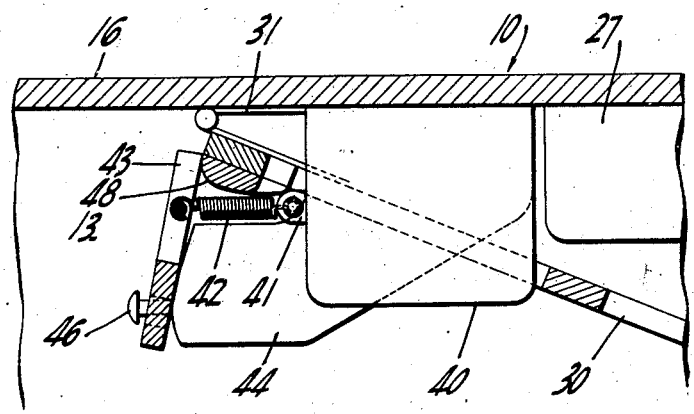
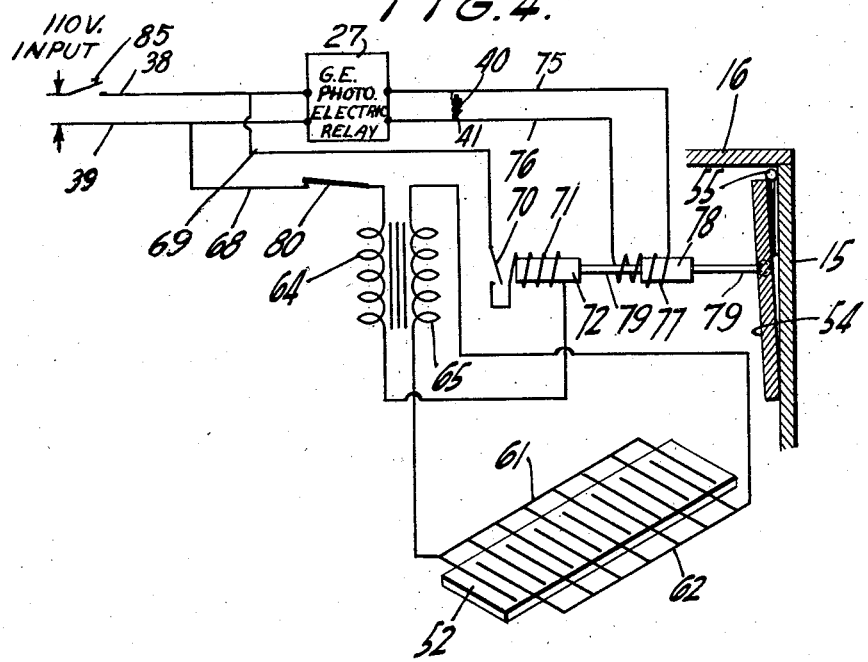
INVENTOR
Chester W. Crumrine
BY
Bean, Brooks, Buckley + Bean.
ATTORNEYS Patented July 13, 1948

2,445,166

UNITED STATES PATENT OFFICE 2,445,166

ANIMAL TRAP

Chester W. Crumrine, Irondequoit Township, Monroe County, N. Y., assignor, by mesne assignments, to L F C Corporation, Rochester, N. Y., a corporation of New York Application December 17, 1942, Serial No. 469,308

2 Claims. (Cl. 43—99)

This invention relates to animal traps and particularly to automatic traps which are especially useful in the extermination of rodents.

Many prior art attempts have been made to provide trap devices with means for automatically resetting traps after an animal has been caught, as well as for removing the body of the animal from the region where it is initially trapped. The most frequently occurring of these prior devices depend generally upon the volition of the animal for movement from an initial zone, either under the urge of curiosity or in an endeavor to escape from the trap. According to the principles of the present invention the movements of the trapped animal after his initial entry into the trapping zone are fully controlled by the trapping means and are not dependent in any manner on voluntary action of the animal.

As will be seen from the following description of an exemplary embodiment of the invention, the mere presence of an animal in a trapping zone initiates a cycle of operation which includes positively and forcibly moving the animal to a confined area where he is electrocuted, following which the body of the animal is automatically moved to a further zone to free the confined electrocution area for subsequent use on another animal. Immediately following the movement of the animal body to the confined area at the beginning of the cycle of operation the animal moving instrumentalities are automatically conditioned for forcibly moving another animal to the confined area upon entry of such other animal into the trapping zone.

The entire cycle of operation is short in duration and, further, successive cycles may overlap to a certain extent. For this reason the efficiency of the device is greatly enhanced and it is in fact able to deal with conditions such as are encountered in highly infested areas. Extermination on a wholesale scale may be efficiently practiced.

The present invention is further characterized by the fact that the initial impulse which begins the trapping operation is of such nature as not to excite the suspicion of the animal and the succession of events following this impulse is carried out in such a manner and at such speed as to absolutely preclude the possibility of escape of the animal. The general trapping arrangement of the invention is, moreover such that nothing in the trapping cycle is calculated to discourage other animals from subsequently entering the trap or to arouse their suspicion as to the nature of the device.

While a single specific embodiment of the invention is illustrated in the drawings and described herein by way of example, it is to be understood that the broad principles of the invention are not limited thereto or otherwise than as defined in the appended claims.

In the drawings:

Fig. 3 is a fragmentary cross-sectional view of the animal impelling means, viewed as in Fig. 1 but on an enlarged scale and in another position of operation; and Fig. 4 is a schematic view of the electrocution portion of the device and a complete wiring diagram of the apparatus.

Figure 1:
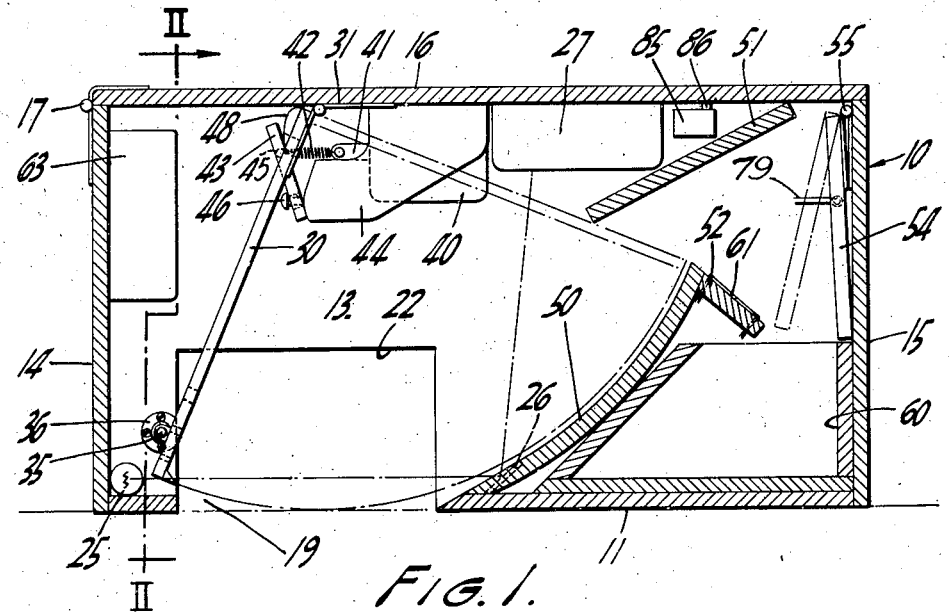
Fig. 1 is a cross sectional view of one form of apparatus constructed in accordance with the invention taken on the line I—I of Fig. 2.

Throughout the several figures of the drawings, like characters of reference denote like parts and the numeral 10 designates generally a box-like casing or housing having a bottom wall 11; front and rear walls 12 and 13, respectively; side walls 14 and 15; and a top closure wall 16 hinged to the side wall 14 as at 17. It will be noted that a portion of the bottom wall 11 is broken away to form a passageway 19, Fig. 1, and this clear passageway extends entirely from the front wall 12 to the rear wall 13; there being entranceways formed in these two walls at each end of the passageway 19. The entranceways in the walls 12 and 13 are designated 21 and 22, respectively, and cooperate with the passageway 19 to provide a clear and uninterrupted zone which forms a mere continuation of the floor or other surface upon which the trap may be resting. It is during the free passage of an animal through this zone that its freedom is abruptly arrested and the entire trapping and disposing cycle is begun and automatically continued to completion.

A light source is designated 25 and rays therefrom are normally received by a mirror 26 suitably secured at the opposite side of the animal passageway. The mirror 26 is positioned at such an angle as to reflect light from the source 25 to a photoelectric cell (not shown) which forms a part of a photoelectric relay unit designated 27 in Figs. 1 and 3. The details of this unit need not be illustrated since it is available commercially and its principles are known to those skilled in the electrical arts. Relays of this kind are marketed by the General Electric Company under the designation "Photoelectric Relay" and comprise, essentially, a photoelectric cell, connected in the grid circuit of an electronic amplifying tube, the output circuit of which controls the condition of a micro-switch. The unit includes potentiometers and suitable transformers for using the unit with ordinary 110 volt alternating current. Further, commercial units of this kind may be selectively connected in such a way that the micro-switch will be either opened or closed by energization of the photoelectric cell.

In the example now being described the relay will be so connected as to hold the micro-switch thereof open at all times when the light ray from the source 25 reaches the photoelectric cell of the relay 27 uninterrupted. Interruption of the ray by the presence of an animal across its path results in closure of the micro-switch which immediately moves the animal from the open passageway 19 in a manner which will now be described.

Figure 2:
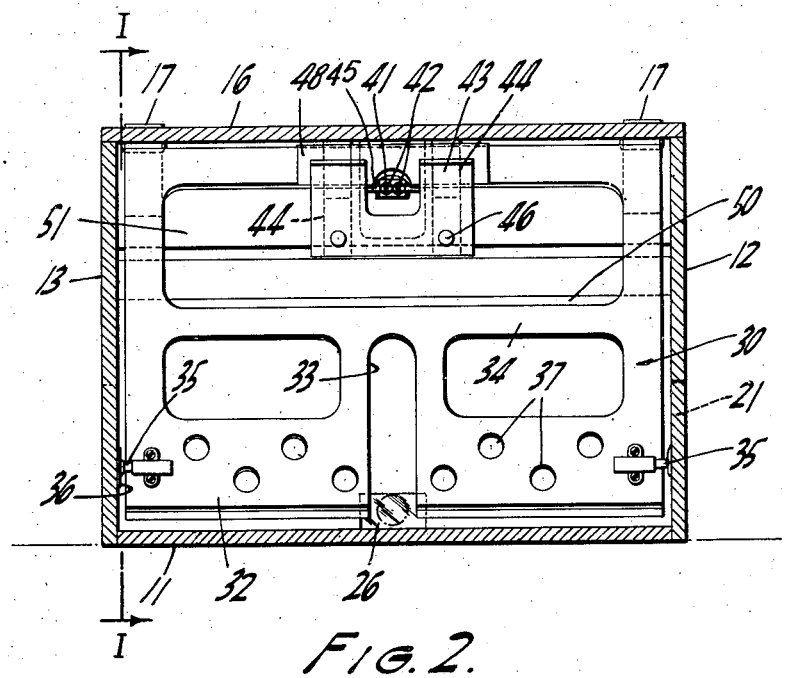
Fig. 2 is a cross-sectional view taken approximately on the line II—II of Fig. 1.

Referring particularly to Figs. 1 and 2, the numeral 30 designates an open rectangular frame whose upper edge is hingedly connected to the top closure 16 as at 31 and whose lower portion 32 is of substantial vertical extent, see Fig. 2, whereby it may sweep across the animal passageway and forcibly remove an animal therefrom in a lateral direction with respect to the passageway. It will be noted that the lower portion 32 is slotted as at 33 to avoid interference with the light rays both between the source 25 and the mirror 26 and between the mirror 26 and the relay unit 27. The avoidance of such interference is of particular importance with respect to the return stroke of the frame 30. To reinforce the thus-divided lower portion 32 an intermediate horizontal rail 34 is shown in Fig. 2. The frame is normally held in inoperative but preset position, that being the position indicated in full lines in Fig. 1, by spring-pressed detent pins 35 which engage seat elements 36 secured to the front and rear walls 12 and 13 of the device. Openings 37 formed in the lower portion 32 of the frame 30 reduce air friction during the sweeping swing of the frame 30 and lighten the frame whereby its inertia is reduced.

The lower portion 32 of the frame 30 constitutes in effect an animal impeller, and for moving the impeller quickly and forcibly across the animal passageway, by pivotal movement of the frame 30, an electromagnet 40 is provided. The coils of the electromagnet are in series with the micro-switch of the photoelectric relay 27 so that they become energized immediately upon interruption of the light rays between the light source 25 and the photoelectric relay. This circuit is an inherent part of the commercial photoelectric relay hereinbefore referred to and an understanding of its operation is not required to practice the present invention. It is merely necessary to attach input conductors 38 and 39 to the proper terminals of the photoelectric relay, as shown in Fig. 4, and to connect output conductors to other terminals of the relay, which conductors are to be energized during periods when the light beam is interrupted, in accordance with directions furnished with the relay.

The electromagnet 40 has a core or armature 41 which is normally held in the position of Fig. 1 by a pair of extension coil springs 42 which connect between it and a plate 43 which is loosely pivoted to a pair of abutment blocks 44 which are secured to the under side of the hinged top closure 16. A pin 45 is supported at its ends by plate 43 as shown in Fig. 2 and engages corresponding ends of springs 42. The pivotal connection of the plate 43 to the blocks 44 may be by means of pins 46 engaging clearance openings formed in the plate 43.

The upper marginal portion of the frame 30 has a bar 48 secured thereto whose surface is so formed as to provide a cam for engagement with the abutting surface of the plate 43 at a point spaced upwardly substantially from the pivotal support of the plate. By reason of the curved surface of the bar 48 its point of engagement with the plate 43 varies in different angular positions of the frame 30 as the latter moves on its hinges 31. Beginning with the parts in the full line position of Fig. 1, the plate 43, when the electromagnet is energized and through the medium of the springs 42, exercises a force tending to pivot the frame 30 in a counterclockwise direction, or to the right as viewed in Figs. 1 and 3. The lever arm of this force is measured from the pivotal axis of the frame 30 to the point of tangential engagement between the plate 43 and the cam bar 48. It will be noted that this lever arm decreases progressively as the frame moves to the right as seen in Figs. 1 and 3, until a minimum lever arm is reached when the frame is in its extreme right hand position, shown in Fig. 3.

This arrangement has the advantage of providing a relatively long lever arm at the beginning of the active stroke of the frame 30 when it must be moved free of the detents 35, 36 and its inertia must be overcome, with a shorter lever arm for swift movement of the frame to the end of its effective stroke after a certain degree of acceleration has been imparted to the frame. The springs 42 store energy at the beginning of the cycle, when the attractive force of the magnet has not reached maximum and its effect on the armature is low by reason of the relative remoteness of the latter. When the stored energy is sufficient to free the frame 30 from the detents 35, 36, the stored energy, plus the then full force of the electromagnet, move the frame 30 swiftly to the dot and dash line position of Fig. 1. Upon subsequent de-energization of electromagnet 40, the frame 30 swings from the dot-and-dash line position of Fig. 1 under the force of gravity and its inertia is sufficient to carry it beyond a perpendicular position and into retaining engagement by the detents 35, 36.

In Fig. 1 the numeral 50 designates an arcuate ramp which cooperates with the lower portion 32 of the frame 30 to direct the animal upwardly in the casing after the frame 30 has swung past the entranceways 21 and 22 of the passageway. The frame 30 throws the animal against a casing portion comprising an oblique wall section 51 which extends horizontally between the front and rear walls 12 and 13 of the casing. The wall 51 is so disposed as to deflect the animal into an electrocution chamber which is defined by a fixed bar or plate 52 disposed adjacent the upper edge of the ramp 50 and a movable wall portion 54, which, as will later appear, occupies the dot and dash line position of Fig. 1 when an animal body is projected into the trough-like chamber so formed.

The wall portion 54 is hinged at its upper end to the side wall 15 as shown at 55 and is movable to the full line position illustrated for the purpose of depositing an animal body in a drawer or receptacle 60 after electrocution is complete. The drawer 60 may be removed through a suitable opening in either the front wall 12 or the rear wall 13, and for convenience the adjacent end of drawer 60 may comprise the closure for the wall opening, although this detail forms no part of the present invention. In the present instance the electrodes are shown schematically in Fig. 4 to comprise opposed grills 61 and 62, both carried on the face of the bar or plate 52.

The manner in which the energization of the electrodes and the position of the hinged wall portion 54 is controlled shall now be described. A transformer of suitable capacity is illustrated at 63 in Fig. 1 and its primary and secondary windings are shown schematically at 64 and 65, respectively, in Fig. 4. The primary circuit of the transformer is as follows. The numerals 68 and 69 designate a pair of conductors constituting a source of power supply which may merely be a connection in parallel with the power supply connections of the photoelectric relay 27 so that the plugging in of a single wall plug or the like suffices to power the entire device.

Besides the primary winding 64, the primary circuit 68, 69 includes a normally open switch 70 and a winding 71 which, when the primary circuit is closed, serves to hold an armature 72 against the switch 70 to maintain the same in circuit closing position. For initially closing the primary circuit 68, 69, conductors 75 and 76 connect in parallel with the terminals of the electromagnet 40, whereby the circuit 75, 76 is given a momentary energization concurrently with energization of the electromagnet 40. The circuit 75, 76 includes a winding 77 which acts upon an armature 78 to initially close the normally open switch 70 of the primary transformer circuit 68, 69. To this end the armatures 72 and 78 are fixed to a common operating bar 79, and in Fig. 4 this same bar 79 has pivotal connection with the hinged wall element 54 to move it to the dot and dash line position of Fig. 1 for receiving and holding an animal in position to be electrocuted. The wall portion 54 is normally biased to the full line position shown in Figs. 1 and 4 and this may be effected by simply using spring hinges at 55.

It will be seen from the foregoing that initial closure of the switch 70 by reason of the momentary energization of the circuit 75, 76 results in the circuit 68, 69 being held closed after the initial impulse of the circuit 75, 76 through operation of the winding 71 and armature 72. A bimetallic switching device 80 is also disposed in the primary circuit 68, 69. This switch is closed at ordinary temperatures but is arranged to be heated by current flow and accordingly opens automatically at a predetermined time after the electrocuting circuit is initiated.

The secondary winding 65 of the transformer 63 is connected in series with the spaced electrodes 61 and 62 as is clear from Fig. 4. It will be noted that opening of the primary circuit through the bimetallic switch element frees the normally open switch 70 and causes the hinged wall element 54 to move to its full line position, under the impetus of the spring hinges 55. This pivotal movement of the wall element 54 permits the body of the animal to be deposited in the drawer or receptacle 60.

It will be noted that lifting of the top closure wall 16 by pivotal movement about its hinges 17 withdraws the frame 30 and its various operating parts, including the photoelectric relay 27, from the casing 10. The structure is thus readily made accessible for inspection, adjustment or repair. To render inspection of the interior of the casing 10 safe, a switch device 85 may be disposed against a wall of the casing 10, for instance the wall 13 in Fig. 1, with one contact element 86 thereof secured to the top closure 16. This switch may be arranged in the main power supply circuit of the device and will therefore result in assurance that all circuits of the device are open whenever the top closure 16 is raised.

When an animal by its presence in passageway 19 interrupts light travel from source 25 to the photoelectric relay unit 27, electromagnet 40 is energized to pull the frame 30 out of its engagement with detent seats 36 and rapidly to the position illustrated in dot and dash lines in Fig. 1. An animal is thus swept from the passageway and thrown against wall 51 and drops between plate 52 and movable wall portion 54, the latter being then in the dot and dash line position of Fig. 1. This exposes the animal to the electrocuting grills 61 and 62 of plate 52. After a suitable time delay occasioned by the bimetallic switch 80, the holding circuit established by winding 71 opens and door 54 moves to the full line position of Fig. 1 under the actuation of spring hinge 55 and the electrocuted animal falls into receptacle 60. Bimetallic time delay switch 80 also interrupts the electrocuting circuit. The energization of winding 40 which is occasioned by interruption of the light beam to photoelectric relay 27 is momentary so that frame 30 swings back to its full line position of Fig. 1 almost immediately after its swing to the right, as there shown, thus conditioning the trap for a subsequent trapping operation.

What is claimed is:

1. An animal trap comprising a housing having an opening extending longitudinally therethrough at its bottom side to provide an unobstructed longitudinal animal passageway, said housing having a casing portion laterally adjacent said passageway, means normally adjacent said passageway opposite said casing portion and movable across said passageway to project an animal into said casing portion, an electrical operator for said movable means, and light sensitive means actuated by the presence of an animal in said passageway for energizing said operator to move said movable means quickly from normal position to said casing portion to project an animal thereinto, an electrocuting portion in said casing portion, said electrocuting portion being energized simultaneously with said operator, and time delay means for maintaining said electrocuting portion energized for a predetermined interval of time.

2. An animal trap comprising a housing having an opening extending longitudinally therethrough at its bottom side to provide an unobstructed longitudinal animal passageway, said housing having a casing portion laterally adjacent said passageway, means normally adjacent said passageway opposite said casing portion and movable across said passageway to project an animal into said casing portion, an electrical operator for said movable means, and light sensitive means actuated by the presence of an animal in said passageway for energizing said operator to move said movable means quickly from normal position to said casing portion to project an animal thereinto, an electrocuting portion in said casing portion, said electrocuting portion being energized simultaneously with said operator, time delay means for maintaining said electrocuting portion energized for a predetermined interval of time, and means likewise operable by said time delay means for freeing the animal body from the electrocuting zone at the end of said predetermined interval.

CHESTER W. CRUMRINE.

(References on following page)

REFERENCES CITED

The following references are of record in the file of this patent:

UNITED STATES PATENTS

| Number | Name | Date |
|---|---|---|
| 224,235 | Shulenbarger | Feb. 3, 1880 |
| 518,483 | Bragunier | Apr. 17, 1894 |
| 1,048,995 | Morawiecki | Dec. 31, 1912 |
| 1,052,957 | Pryor | Feb. 11, 1913 |
| 1,464,697 | Connolly | Aug. 14, 1923 |
| 2,107,080 | Mitchell | Feb. 1, 1938 |
| 2,229,300 | Montroy et al. | Jan. 21, 1941 |
| 2,247,931 | Vincent et al. | July 1, 1941 |
| 2,312,209 | Colwell et al. | Feb. 23, 1943 |